Patented Jan. 31, 1950

2,495,751

UNITED STATES PATENT OFFICE 2,495,751

CONVERSION OF HYDROCARBONS WITH MODIFIED CLAY CATALYSTS

George Alexander Mills, Ridley Park, and Edward B. Cornelius, Swarthmore, Pa., assignors to Houdry Process Corporation, Wilmington, Del., a corporation of Delaware No Drawing. Application April 30, 1946, Serial No. 666,180

8 Claims. (Cl. 196—52)

The present invention relates to the catalytic conversion of hydrocarbons such as fractions obtained or derived from petroleum or other carbonaceous or hydrocarbonaceous materials. It is chiefly concerned with catalytic conversion employing cracking catalysts. A "cracking catalyst" is understood in the art as one promoting essentially the scission of carbon to carbon linkages in hydrocarbon compounds, although other chemical reactions including condensation may and ordinarily do coincidentally take place.

The cracking catalysts chiefly used in commercial operation comprising intimately associated silica and alumina may be products of natural origin such as acid-activated bentonite clays or masses synthetically produced by precipitation and combination of silica and alumina. There are some abundant and inexpensive clays, of which the certain kaolins are an example, which although of interest as showing some cracking activity, do not respond to acid treatment to produce catalyst of sufficient high activity level, or because of their tendency to produce disproportionate quantities of coke deposit compared to the yield of desired liquid products including gasoline, have not entered into commercial use as hydrocarbon conversion catalysts.

The value of a contact mass in catalytic cracking of hydrocarbon materials depends to a large extent upon its selectivity in producing from a charge stock high or acceptable yields of desired liquid products such as motor fuel with relatively low production of by-product gas and coke, particularly the latter. Although gaseous by-products can be usefully employed as charge to polymerization, alkylation or other processes, it is nevertheless generally preferable to employ catalysts having an inherent tendency to produce high ratios of normally liquid to gaseous products, since, even with such catalysts higher yields of gaseous products can be obtained, if desired, by the control of the severity of cracking conditions. The coky deposit formed in a cracking operation, however, represents loss of charge to products that are not essentially recoverable, and the reduction of the quantity of this product even as to small changes in ratio of coke produced to gasoline yield are highly significant in the consideration of the economics of commercial operation.

The inherent catalytic properties of a catalyst with respect to comparative coke and gas making tendencies as well as its ability to produce cracked liquid products are determinable by test carried out under standardized conditions. One such test in current use is that known as the "CAT-A" method, described in "Laboratory method for determining the activity of cracking catalysts" by J. Alexander and H. G. Shimp, page R-537, National Petroleum News, technical section, August 2, 1944. In accordance with that method, a light gas oil is subjected to contact with the catalyst under fixed cracking conditions and the activity index of the catalyst is expressed in terms of volume per cent of obtained gasoline; the weight per cent of wet gas, specific gravity of the wet gas, and the weight per cent of carbonaceous deposit are also determined. Notations of catalyst activity in the present specification have reference to that determined by the above test.

Although acid-activated bentonite clays of high cracking activity as well as synthetic silica-alumina gels are currently employed in commercial processes of hydrocarbon conversion, these synthetic catalysts offer advantages from the standpoint of higher ratios of gasoline formed to coke deposited, superior stability particularly in use with stocks causing abnormal loss of catalytic activity, and better performance characteristics in the motor fuel produced.

Raw clays ordinarily contain in addition to the principal compounds and complexes of silica and alumina lesser proportions of compounds of iron, calcium, magnesium, etc. Some clays also include among their lesser components, compounds of zirconium or titanium. In the conventional treatment of adsorbent clays with acid to activate the same, a portion of these minor metal compounds is removed along with portions of the aluminum content, but such treatment as conventionally practiced results in masses still containing fairly large percentages of iron, giving rise to certain disadvantages in contact masses formed therefrom particularly when used as catalysts in hydrocarbon conversion.

By methods described in our copending application Serial Number 666,179 filed of even date herewith, and which issued as Patent No. 2,489,309 on November 29, 1949, there are produced from clays as starting material improved contact masses of low or lessened iron content demonstrating generally the desirable characteristics of synthetic silica-alumina gel catalysts. In accordance with the preferred procedure therein described, clay is extracted with acid to an extent at least sufficient to dissolve a substantial portion of the aluminum, iron and other metal content of the clay. The acid extract liquor containing the dissolved aluminum and other metals such as iron, calcium and magnesium as salts of the acid employed, is treated to remove selectively the undesired metal contaminants while retaining the aluminum. The dissolved aluminum salts contained in the purified acid liquor are recovered and reincorporated in modified form with the original acid-extracted clay residue, optionally together with desired metal compounds.

In accordance with the present invention hydrocarbon conversion processes of the type employing clays or other cracking catalysts are advantageously improved by the use of novel composite catalysts comprising an acid treated clay composited with an aluminum product derived from a purified acid extract of the clay. Such catalysts can be prepared generally by the methods described in the application above identified or as further described below.

The raw product employed as starting material for the preparation of these catalysts may be any argillaceous substance of the nature of clay having chiefly the composition of hydrosilicates of alumina and is not limited to clays such as the sub-bentonites which are normally activated by acid to high level of acitivity. Thus, cracking catalysts of acceptable activity level and good performance characteristics can be prepared by the described methods from relatively inactive clays and from clays which are not activatable to the extent of those conventionally employed in decolorizing or as cracking catalysts. Clays of the type commonly designated as kaolins in addition to those of the montmorillonite family including the usual bentonites accordingly come into consideration as good sources for the present catalyst preparations.

The specific details of the process for preparing the new catalysts may to some extent be governed by the type of conversion process in which it is to be used. Although in some processes of hydrocarbon conversion, as in the so-called "fluidized bed" operation, the catalyst has been employed in finely divided form, in other types of operations including those using a fixed or moving catalyst bed, particles or pieces of larger dimension are preferred. If the catalyst is to be molded, extruded or otherwise formed into aggregates or pieces, the forming operation may be carried out on the raw clay, or a finely divided clay may be subjected to acid treatment as hereinafter described and the forming operation deferred until a subsequent step in the process.

To enhance the effect of the acid in the dissolution of aluminum as well as iron from the clay it is often advantageous to first calcine the raw clay, which may be done at temperatures of from about 300° F. and upwards, but below the temperature at which the clay is caused to sinter or shrink rapidly, which for most clays generally takes place at temperatures above about 1500–1600° F.

Instead of calcining the raw clay with air, other gases or vapors may be employed, particularly reactive gases which effect the freeing of iron compounds from the clay. For instance the raw clay or one which has received a preliminary mild acid treatment may be treated with hydrogen sulfide or carbon disulfide at elevated temperature of about 300° to about 1600° F. to convert the iron present therein to iron sulfides which may then be more readily extracted by the subsequent acid treatment. In copending applications filed January 30, 1946, Serial Numbers 644,421 and 644,422 and 644,423, which issued as Patent Nos. 2,466,046, 2,466,047 and 2,466,048, respectively, on April 5, 1949, there are disclosed methods of treating raw or acid-treated clay with reactive gases, which may be followed by acid leaching to obtain improved contact masses from which a portion of the iron is thereby removed. Clays which have been treated with reactive gases or vapors as disclosed in these applications may accordingly be then acid treated and the aluminum from the acid liquor thus obtained incorporated with the clay residue to produce catalysts useful in accordance with the present invention.

If the raw clay subjected to the gas or vapor treatment or air calcination as above described is in the form of coarse particles or more regular agglomerated pieces, the same may be subjected to acid treatment while retaining the same form, or if desired may then be further comminuted. The raw or pretreated clay in any case is subjected to acid treatment to dissolve aluminum compounds along with iron compounds and other contaminants, the acid liquor purified and the aluminum reprecipitated on the clay residue. Carrying out the acid treatment on preformed clay pieces offers the convenience of easy separation of the clay residue from the acid liquor for ready purification of the liquor. On the other hand, the contact masses may be used in finely divided condition so that formation of aggregates is not essential or the forming or shaping step may be deferred until the acid leached clay residue has been reincorporated with the aluminum precipitated from the acid liquor. The procedure according to the latter embodiment has advantages from the operation standpoint. Thus, the finely divided clay after acid treatment and water washing, if desired, can be added as a continuous stream to the purified acid liquor and the precipitating agent for the aluminum injected continuously into the stream to form the composite. Alternatively, the purified acid liquor and precipitant solution or suspension may be injected into a slurry or stream of clay suspension. The precipitation of the aluminum compound in the presence of the clay suspension in accordance with these embodiments can be employed to advantage with the type of continuous mixer and extruding head described in U. S. Patent 2,370,200, isssued to Hubert A. Shabaker, February 27, 1945.

The extent of the acid treatment of the clay governed by such factors as concentration, time and temperature, may be varied over a wide range but should be sufficient at least to extract substantial quantities of alumina. As the acid treatment of a clay is progressively extended as measured by the quantity of alumina removed from the clay, the catalytic cracking activity of the clay is often enhanced until a point of maximum or optimum activity of the clay residue is reached, beyond which, no further improvement in activity characteristics is obtained on continued acid treatment, and in fact, the activity of the clay residue may decline on further acid treatment. The extent of acid treatment for the present purpose, however, is not limited by these considerations of the activity of the obtained clay residue, since the activity of the acid treated clay residue does not necessarily determine the activity of the finished catalyst containing the redeposited alumina. Catalysts showing substantial improvement in activity over the original or acid treated clay are obtained by the described procedure whether the acid treatment effects increase or reduction of the cracking activity of the clay. Composite catalysts having improved gasoline/coke ratios are already obtained with a mild acid treatment removing as little as 1% of the aluminum content of the clay. On the other hand, catalysts of high activity levels may be obtained even with clays having a high content of alumina, by the removal and redeposition of 90% or more of the original aluminum content. It accordingly appears that the invention is not limited to any particular extent of the acid treatment and includes treatments effecting substantially complete extraction of the alumina. As a general rule with most clays excellent composites are obtained when the acid treatment is carried out to remove more than 5% and up to about 80% of the original aluminum content of the raw clay.

The rate at which alumina is extracted from a particular clay by the acid, as will be readily understood, will depend upon the kind of acid used, the dilution of the acid, the ratio of acid to clay. the temperature of treatment, and to a lesser extent upon other operating variables, the treatment being continued for the required time to effect the desired extraction. Acid treatment may be effected by, but is not restricted to methods similar to those employed in known processes for "acid activation" in the manufacture of decolorizing clays. For instance concentrated mineral acid such as hydrochloric or sulfuric may be added to an aqueous suspension of clay or dilute acid may be added directly to the raw or dried clay. In known acid activation the weight ratio of acid to dry clay may be from about 20% to 100% (anhydrous acid basis) and in the present methods even higher ratios may be employed, but ratios in the order of 30 to 60% are preferred. The treatment of the clay with the acid is preferably carried out at elevated temperature as at about 160° F. to about the boiling point of the acid mixture. Although organic acids such as acetic or oxalic may be employed, mineral acid is preferred particularly if it is desired to remove relatively large quantities of alumina from the clay. The clay may be permitted to soak in the acid or any known or desired leaching or extracting procedure may be employed. If the clay is washed with water after acid treatment, the wash water may be combined with the acid extract liquor for its content of aluminum compound, or if successive water washes are employed, the filtrates of one or more of the later washes may be discarded.

Of course if the acid treat liquor is to be purified by precipitation therefrom of iron or other contaminants, separation of the clay residue therefrom will be required, which may be accomplished in any known or desired manner including filtration or decantation. Such separation will not always be necessary, as hereinafter pointed out, so that the precipitant for the aluminum compound may be added directly to the mixture of clay and acid with suitable agitation to obtain uniformity of reaction. As precipitant for the aluminum compound any reagent may be employed which will form an insoluble aluminum compound, for example, a gelatinous precipitate or gel, for instance alkali metal or ammonium hydroxide or strong organic bases such as amines or quaternary bases such as trimethyl benzyl ammonium hydroxide. Other reagents that may be employed include soluble phosphates, or silicates which form under appropriate controlled pH conditions gelatinous or other precipitates comprising aluminum hydrosilicate or gel complexes including silica and aluminum compounds such as alumina, which compounds or composites have catalytic activity. In order to effect faster setting of the gel or precipitate appropriate agents may be added including acid or alkaline substances to modify the pH of the composition. For instance with alkaline silicate as the precipitating agent it is advantageous to control the hydrogen ion concentration to effect gelation at pH of 5 to 10 or above as by the addition of ammonia and/or ammonium sulfate. The precipitating agent may be another metallic salt, such as a soluble zirconium salt which forms compounds or complexes with alumina.

If the precipitant forms with the aluminum a definite chemical compound, the precipitant may be added in stoichiometric amount or slightly in excess of the estimated or previously determined aluminum content of the acid liquor. On the other hand, reagents forming complexes of varying ratio, may be added in amounts varying over a wide range depending upon the ratios offering optimum or desired activity. Thus in the case of silicate being added, although wide variation is possible, it is preferred to employ an amount furnishing at least a weight ratio of $SiO_2/Al_2O_3$ in the precipitate of 60/40, irrespective of the $SiO_2/Al_2O_3$ ratios of the original raw clay or the acid treated clay residue. Proportions of silicate giving a ratio of $SiO_2/Al_2O_3$ in excess of about 95/5 result in little or no improvement in activity of the acid treated clay.

The purification of the acid liquor to remove iron or other impurities may be accomplished by treating the same with reagents selectively forming insoluble iron compounds without substantial precipitation of aluminum compounds, for example sodium hydroxide or potassium ferrocyanide, and the iron may be recovered as a valuable reaction product. In using sodium hydroxide as reagent, the precipitate will also contain quantities of calcium hydroxide and magnesium hydroxide. Instead of precipitating the iron, selective removal may be effected by precipitation of the aluminum, retaining the iron in solution as a soluble complex. Separation may alternatively be effected by selective partitioning liquids such as by treatment with ether, and hydrochloric acid or ether and an alkali metal thiocyanate whereby the formed iron compound is extracted in the ether layer. In fact any method selectively separating iron and aluminum compounds may be employed including fractional or selective crystallization as for instance in the case of ammonium sulfate as reagent taking advantage of the difference in solubility of the formed alumina.

Instead of removing the iron from the acid liquor, the unpurified acid liquor may be treated to precipitate the aluminum in the gel occluding the iron in a form that can readily be washed or dissolved out of the gel. Thus the acid liquor may be treated with alkali metal silicate under alkaline conditions to form a silica alumina gel in the presence of the clay and the gel or composite treated with a soluble cyanide to convert the iron to soluble ferrocyanide which can be washed from the gel. Following this procedure, previous separation of the clay residue from the acid treat liquor will not be required. Likewise, where the iron is removed from the acid liquor electrolytically as by deposition on a mercury electrode, separation of the acid liquor and clay residue will not be necessary.

The composite of clay and aluminum precipitate or gel obtained in accordance with any of the methods above described may be made into a catalyst or other contact mass and finished in any known or desired manner which may include in any order of sequence washing, drying and forming into desired shapes and sizes. If the composite contains alkali metal in soluble or exchangeable form the same may be removed by washing the composite preferably after drying, with acidic solutions or solutions of ammonium salts. Other metal salts or oxides may be incorporated into the composite by adsorption or ion exchange including for example those of zirconium, beryllium, chromium, or further quantities of alumina or other aluminum compounds in addition to that derived from the acid liquor. If desired, a portion of the purified acid treat liquor containing aluminum salts may be reserved and employed as a base exchange agent at this stage.

For catalyst use the composite should be finally calcined at a temperature above 500° F. in air or steam or in mixtures of the same, although, if desired, the calcination may be effected in the use of the catalyst incident to the high temperatures encountered in hydrocarbon contact and regeneration of the catalyst.

Agglomerated masses or pieces of the composite contact mass may be formed by suitably breaking up a dried filter cake or more regular sizes and shapes may be obtained by dry tableting or by molding including casting or extruding of the wet or wetted comminuted material. If desired, the clay residue in finely divided form may be incorporated with a hydrosol formed from the aluminum in the acid extract liquor and the composite set as droplets in a static or turbulent water immiscible liquid to produce contact masses of the "bead" type.

In the use of the catalysts according to the present invention no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Since in polymerization of hydrocarbons, catalysts of high activity are required, the present catalysts offer particular advantages. In carrying out such polymerization of gaseous hydrocarbons to higher molecular weight liquid products, lower temperatures and higher pressures are required than are usually employed in the cracking processes above referred to. The preferred conditions for this operation employ pressures sufficient to retain the reactants in liquid phase but generally not in excess of about 600 to 800 pounds per square inch, operating at temperatures below the critical temperatures of the particular gases, including about 0° to 450° F. for most gaseous hydrocarbons; with some gases such as isobutene even lower temperatures may be employed. Under the stated range of conditions, the reaction rate may be in the order of about 5 to 200 liters of gas per liter of catalyst per hour, the shorter contact time being employed with the higher temperatures.

*Example I*

A raw kaolin clay from Putnam County, Florida, known commercially as "Edgar EPK" was treated with 20% HCl for one hour on a steam bath using 8.8 parts by weight of the dilute acid to 4 parts of clay. The extract obtained was separated by filtration and treated with strong caustic soda to yield a precipitate comprising chiefly iron compounds which were removed. A portion of the iron freed filtrate was reacidified and combined with acid extracts obtained on repeated acid treatment of part of the original clay residue over a period of several days until the residue was reduced to an $Al_2O_3$ content corresponding to about $82SiO_2:18Al_2O_3$. The combined extracts were adjusted to pH 3.0 with $NH_4OH$.

The resulting clay residue was slurried with the above acid liquor and the slurry added to diluted sodium silicate solution ("N-Brand") in proportions giving 187 parts of $SiO_2$ in the silicate solution to 30.5 parts of $Al_2O_3$ in the acid liquor. Partial gelation occurred and was completed by the addition to the mix of dilute $NH_4Cl$ and concentrated $NH_4OH$ solutions to bring the mix to a pH of 7.9.

The obtained composite was broken up and dried in an oven overnight and the dried gel base exchanged with 10% ammonium chloride to remove zeolitically held salts and washed with water a number of times until chloride free, and the washed gel oven dried overnight at 212° F. The obtained dried mass was then ground in a ball mill with addition of water and cast into pellets which were then oven dried at 200° F.

The raw clay employed in this example had the following analysis by weight on a dry (105° C.) sand-free basis:

| | Percent |
|---|---|
| Ignition loss | 12.9 |
| $SiO_2$ | 46.6 |
| $Al_2O_3$ | 38.8 |
| $Fe_2O_3$ | 1.0 |
| CaO | 0.44 |
| MgO | 0.23 |
| $TiO_2$ | 0.35 |
| Alk. metal (as oxides) | 0.52 |

The calculated proportions of acid treated clay residue to synthetic gel was 20/80, the gel containing approximately 86% $SiO_2$/14% $Al_2O_3$.

The pellets above obtained were calcined at 1400° F. for ten hours in the presence of 5% steam and then employed in cracking of a light east Texas gas oil under the following operating conditions: Charging 1.5 volumes of the oil (previously heated to vaporize) per volume of catalyst per hour at a temperature of about 800° F. and at atmospheric pressure, the operation being continued for ten minute periods followed by regeneration. There was obtained an average of 45.1% by volume of gasoline (410° F. cut) based on the volume of fresh stock charged, with the production of 3.1% by weight of coke and 8.6% by weight of gas produced having a specific gravity of 1.61.

Example II

Another portion of the iron-freed filtrate obtained in the preceding example was composited with part of the clay residue from acid treatment at that stage (containing $55SiO_2/45Al_2O_3$) in the presence of sodium silicate solution giving 98 $SiO_2/2Al_2O_3$ with the aluminum content of the acid liquor. The composite was treated, washed and purified as in the preceding example and similarly pelleted and calcined.

Employed in the cracking of the gas oil and under similar conditions as in the preceding example, there was obtained 29.5% by volume of gasoline, with 1% by weight of coke and 3.7% by weight of gas of 1.37 specific gravity.

The excellent gasoline to coke ratio obtained at this activity level is indicative of the behaviour of the novel catalysts and demonstrates their superior properties in cracking of heavy stocks.

Example III 1020 parts of the raw kaolin of Example I were acid treated with 20% HCl acid solution (.40 anhydrous acid to dry clay basis) by stirring for 4 hours at 93° C. The slurry was filtered and the filtrate freed of iron by treatment with $K_4Fe(CN)_6$. A portion of the filter cake washed chloride free was slurried in a portion of the iron free filtrate and the slurry partly neutralized with stirring to a dilute sodium silicate solution (96 parts $SiO_2$ from the silicate to 17 parts $Al_2O_3$ in the liquor). Gelation was completed with the addition of concentrated $NH_4OH$ which brought the mixture to an approximate pH of 9.0.

The obtained gel material was treated in the usual manner which included filtration, base exchange of zeolitically held materials with $NH_4+$ and final washings. The washed material was oven dried and then mixed with water and extruded to form pellets which are dried and calcined as in the preceding example. There was obtained on cracking of a light gas oil under the standard test conditions 35.2% by volume of gasoline with 1.5% by weight of coke and 5.1% by weight of gas of 1.44 specific gravity.

Example IV

Eight parts by weight of a dry ground bentonite clay from Montgomery County, Alabama, heated to 150° F. were added, slowly enough to maintain the 200° F. temperature of acid solution, to a sulfuric acid solution containing 4.15 parts of concentrated $H_2SO_4$ (96.5%) and 27.8 parts of water. During the twelve hour treat approximately 8 parts of water were added to the agitated (by hot air) mixture to maintain the liquid level. After cooling for one and one-half hours, the material was filtered and washed, batchwise, with 16 parts of water each time for six times.

A portion of the acid filtrate combined with wash water liquor was treated with strong caustic solution at 85° C. for 30 to 45 minutes. The precipitate formed, which was composed chiefly of iron compounds, was removed by filtration.

A portion of the iron-freed filtrate containing .57 part of $Al_2O_3$ were combined with 12.5 parts of the clay filter cake described in the first paragraph above. To this slurry was added a sodium silicate solution (14.5 parts "N-Brand") containing 4.15 parts of $SiO_2$. The addition to this stirred mixture of 131. parts of a 1.141 sp. gr. solution of $(NH_4)_2SO_4$ caused gelation at a pH of 9.5.

This gelatinous material was filtered and fast dried at 240° F. for 2½ hours. The dried material was then washed ten times with water, treated four times with $NH_4Cl$ solution and washed chloride free. The washed material was oven dried, ground for 3 hours and then mixed for 45 minutes with about an equal quantity by weight of water, cast into pellets and dried.

The raw bentonite clay employed in this example had the following analysis by weight on a dry (105° C.) basis:

| | Percent |
|---|---|
| Ignition loss | 8.21 |
| $SiO_2$ | 60.9 |
| $Al_2O_3$ | 19.3 |
| $Fe_2O_3$ | 4.52 |
| $Na_2O$ | 0.13 |
| CuO | 0.0013 |
| CaO | 1.65 |
| MgO | 4.87 |

The ratio of $SiO_2:Al_2O_3$ in the acid treated clay residue was about 81/19. There was present in the composite 66 parts of clay to 34 parts of synthetic silica-alumina gel formed, the synthetic having a ratio of $87.5SiO_2:12.5Al_2A_3$.

The pellets above obtained calcined and used in cracking of a gas oil as in the preceding examples gave the following yields: 35% by volume gasoline, 1.8% by weight of coke and 4.1% by weight of gas of 1.47 specific gravity.

Instead of the particular brand of alkali metal silicate specifically referred to in the above examples, other soluble silicates may be employed as precipitant for the alumina, such as a solution of sodium metasilicate ($Na_2SiO_3.5H \cdot O$), the quantity employed being of course modified appropriately in accordance with the silica content of the particular reagent selected.

The catalyst composites obtained in accordance with the described methods, being of low iron content are of excellent stability and show good resistance to corrosive gases, because of which the novel catalysts are particularly advantageous in cracking and reforming of sour petroleum stocks such as those of high sulfur content, which stocks in contradistinction cause abnormal deterioration and rapid loss of activity of usual commercial catalysts of the ordinary acid-activated clay type. The low coke obtained with these catalysts renders them of special interest for cracking heavy petroleum stocks.

By acid treating clays having an iron content corresponding to 1% or more $Fe_2O_3$, catalyst composites having less than 0.6% $Fe_2O_3$ can be readily obtained by the described methods. By the use of more severe acid treatment as described, or by the selection of raw or modified clays of initial iron content of less than 1% or of clays treated to make the iron more available, composites having less than 0.4% and even less than 0.2% Fe₂O₃ may be obtained.

The invention is not limited to the use of catalyst composites prepared by the coprecipitation of silica-alumina as described in the illustrative examples, since either of the components may be separately adsorbed on the clay residue or separately precipitated and incorporated with the clay residue followed by the other. For instance, for composites comprising silica-alumina, the clay residue containing aluminum salts adsorbed from the acid liquor may be treated with an alkali metal silicate, or the aluminum salt on the clay residue may be first treated to form alumina and the silica then incorporated therewith for instance by hydrolysis of a silicon compound such as an alkyl silicate. Alternatively, the separated clay residue may be first treated to deposit or incorporate silica or a soluble silicate and then brought together with the acid treat liquor furnishing the alumina. Or a composite of clay residue and alumina, with or without silica, may be treated to incorporate other metal compounds such as oxides by adsorption or base exchange, or the additional metal compound, for example a zirconium salt, may be employed as a precipitant for the aluminum in the acid liquor or on the clay residue.

Obviously many modifications and variations of the invention as hereinbefore set forth may be made without departing from the spirit and scope thereof and therefore only such limitations should be imposed as are indicated in the appended claims.

We claim as our invention:

1. The process of converting hydrocarbons of higher boiling range to products in the boiling range of gasoline which comprises subjecting the higher boiling hydrocarbons under catalytic cracking conditions to contact with a catalyst comprising the product prepared by a process including extracting clay with acid to dissolve a portion thereof constituting a substantial quantity of its aluminum content, leaving an undissolved clay residue comprising silica and alumina, purifying the thus obtained acid extract solution by removing iron compounds therefrom, compositing the undissolved clay residue with gel formed by precipitation with an alkali metal silicate of the dissolved aluminum salts in the purified solution, said precipitation being effected in the presence of said undissolved clay residue, freeing the obtained composite of water soluble salts, and calcining the composite.

2. In processes of catalytically treating hydrocarbons in which clay catalysts are normally employed, the step of subjecting such hydrocarbons to contact under catalytic conversion conditions with a modified kaolin catalyst prepared by acid extraction of a substantial portion of the aluminum content of kaolin, leaving a kaolin residue comprising undissolved aluminaceous components, purification of the obtained acid extract liquor to remove iron compounds therefrom and incorporation with the kaolin residue of the product resulting from precipitation with a silicate of aluminum compounds from at least a portion of the purified acid extract liquor, said precipitation being effected in the presence of said kaolin residue.

3. The process of converting hydrocarbons of higher boiling range to products in the boiling range of gasoline which comprises subjecting the higher boiling hydrocarbons under catalytic cracking conditions to contact with a catalyst comprising the product prepared by a process including extracting clay with acid to dissolve a portion of its aluminum content thereby forming an acid extract containing aluminum salts dissolved therein, separating the extract from the clay residue thereby obtained, treating the separated extract with a reagent forming insoluble iron compounds, removing from the extract the insoluble iron compounds so formed to purify the extract, recombining the purified extract with the clay residue to form a slurry, and precipitating an aluminum compound onto the finely divided clay in the slurry by addition to the slurry of an alkali metal silicate in the presence of alkaline hydroxide.

4. The process of converting hydrocarbons of higher boiling range to products in the boiling range of gasoline which comprises subjecting the higher boiling hydrocarbons under catalytic cracking conditions to contact with a catalyst comprising the product prepared by a process including extracting clay with acid to dissolve a portion of its aluminum content thereby forming an acid extract containing aluminum as a salt of the acid employed and also containing iron salt, separating the acid extract from the solid clay residue, treating the separated acid extract with sodium hydroxide to precipitate iron compounds therefrom, separating the precipitated iron compounds, and redepositing on the above acid treated clay residue a product formed by precipitation of the iron-freed acid extract with an alkali metal silicate, said product being precipitated in the presence of said acid-treated clay residue.

5. The process of converting hydrocarbons of higher boiling range to products in the boiling range of gasoline which comprises subjecting the higher boiling hydrocarbons under catalytic cracking conditions to contact with a catalyst comprising the product prepared by a process including extracting clay with acid to dissolve a portion of its aluminum content thereby forming an acid extract containing aluminum as a salt of the acid employed and also containing iron salt, separating the acid extract from the solid clay residue, treating the separated acid extract with a soluble ferrocyanide compound to precipitate iron compounds therefrom, separating the precipitated iron compounds, and redepositing on the above acid treated clay residue the product formed by precipitation of the iron-freed acid extract with an alkaline silicate, said product being precipitated in the presence of said acid-treated clay residue.

6. Process of converting hydrocarbons to valuable liquid products in the boiling range of motor fuel which comprises subjecting the hydrocarbons under catalytic conversion conditions to contact with a catalyst comprising a calcined composite of acid treated clay and silica-alumina gel, said composite being prepared by a process including acid extraction of a portion constituting a substantial quantity of the aluminum content of clay to form an acid extract liquor comprising aluminum and iron salts and residual clay solids, separating the solution from residual clay solids in the liquor, treating the solution to precipitate therefrom the iron content, recombining the residual clay solids with the iron-freed solution to form a slurry, precipitating an aluminum compound onto the residual clay solids by addition to the slurry of an alkali metal silicate in the presence of agents modifying the pH of the slurry, drying the composite thus obtained, treating the dried composite with an ammonium salt solution to free the same of alkali metal ions, and forming the composite into aggregates.

7. Process of converting hydrocarbons to valuable liquid products in the boiling range of motor fuel which comprises subjecting the hydrocarbons under catalytic conversion condition to contact with a catalyst comprising a calcined composite of acid treated clay and silica-alumina gel, said composite being prepared by a process including calcining a clay, extracting the calcined clay with mineral acid to an extent sufficient to dissolve a substantial quantity of the aluminum content of the clay leaving undissolved aluminum compounds in the resulting clay residue, purifying the extract thus obtained to remove iron compounds therefrom, and reacting the purified extract with a soluble silicate in the presence of undissolved clay.

8. Process of converting hydrocarbons to valuable liquid products in the boiling range of motor fuel which comprises subjecting the hydrocarbons under catalytic conversion condition to contact with a catalyst comprising a calcined composite of acid treated kaolin and silica-alumina gel, said composite being prepared by a process including calcining a kaolin, extracting the calcined kaolin with mineral acid to an extent sufficient to dissolve a substantial quantity of the aluminum content of the kaolin leaving undissolved aluminum compounds in the resulting kaolin residue, purifying the extract thus obtained to remove iron compounds therefrom, and reacting the purified extract with a soluble silicate in the presence of undissolved kaolin.

GEORGE ALEXANDER MILLS.
EDWARD B. CORNELIUS.

REFERENCES CITED

The following references are of record in the file of this patent:

UNITED STATES PATENTS

| Number | Name | Date |
|---|---|---|
| 1,837,971 | Joseph | Dec. 22, 1931 |
| 1,898,830 | Guthrie et al. | Feb. 21, 1933 |
| 2,282,922 | Ahlberg et al. | May 12, 1942 |
| 2,288,874 | Anderson et al. | July 7, 1942 |
| 2,320,799 | Ruthruff | June 1, 1943 |
| 2,374,313 | Veltman | Apr. 24, 1945 |
| 2,410,436 | Ewing | Nov. 5, 1946 |

OTHER REFERENCES

Bureau of Mines Bulletin 267, "Acid Processes for the Extraction of Alumina," 1927, pages 46-62.